United States Patent [19]

Kohno et al.

[11] Patent Number: 5,202,814

[45] Date of Patent: Apr. 13, 1993

[54] NONREDUCING DIELECTRIC CERAMIC COMPOSITION

[75] Inventors: Yoshiaki Kohno; Nobuyuki Wada, both of Nagaokakyo, Japan

[73] Assignee: Murata Manufacturing Co., Ltd., Japan

[21] Appl. No.: 902,784

[22] Filed: Jun. 24, 1992

Related U.S. Application Data

[63] Continuation of Ser. No. 666,786, Mar. 8, 1991, abandoned.

[30] Foreign Application Priority Data

Mar. 13, 1990 [JP] Japan .................. 2-63664

[51] Int. Cl.$^5$ .................. H01G 4/10; C04B 35/46
[52] U.S. Cl. .................. 361/321; 501/139
[58] Field of Search .................. 361/321; 501/139

[56] References Cited

U.S. PATENT DOCUMENTS

| | | | |
|---|---|---|---|
| 4,115,493 | 9/1978 | Sakabe et al. | 501/137 |
| 4,386,985 | 6/1983 | Dirstine | 501/139 |
| 4,468,472 | 8/1984 | Kashima et al. | 501/139 |
| 4,767,732 | 8/1988 | Furukawa et al. | 501/139 |
| 4,863,883 | 9/1989 | Menashi et al. | 501/139 |
| 4,987,108 | 1/1991 | Takagi et al. | 501/139 |

FOREIGN PATENT DOCUMENTS

| | | | |
|---|---|---|---|
| 0076112 | 6/1975 | Japan | 501/139 |
| 0017463 | 1/1982 | Japan | 501/139 |

*Primary Examiner*—Mark L. Bell
*Assistant Examiner*—Deborah Jones
*Attorney, Agent, or Firm*—Ostrolenk, Faber, Gerb & Soffen

[57] ABSTRACT

A nonreducing dielectric ceramic composition. A main component includes oxides of Ba, Ca, Mg, Sr, Ce, Ti and Zr, and in the general formula represented by $(Ba_{l-m-n-o}Sr_lCa_mMg_nCe_o)_q(Ti_{1-p}Zr_p)O_3$. In this formula l, m, n, o, p and q satisfy the relationships, $0.05 \leq l \leq 0.30$, $0.005 \leq m \leq 0.22$, $0.0005 \leq n \leq 0.05$, $0.0005 \leq o \leq 0.02$, $0 \leq p \leq 0.20$, $1.002 \leq q \leq 1.03$. The composition includes between 0.02 to 2.0 mole % of one or more of the following oxides $MnO_2$, $Fe_2O_3$, $Cr_2O_3$ and CoO.

2 Claims, No Drawings

NONREDUCING DIELECTRIC CERAMIC COMPOSITION

This is a continuation of application Ser. No. 07/666,786 filed on Mar. 8, 1991, now abandoned.

BACKGROUND OF THE INVENTION

1. Field of the Invention

The present invention relates to a nonreducing dielectric ceramic composition and, more particularly, to a nonreducing dielectric ceramic composition used, for example, in a monolithic ceramic capacitor and the like.

2. Description of the Prior Art

For manufacturing monolithic ceramic capacitors, a dielectric material coated with a sheet of an electrode material is first prepared. The electrode material serves as an internal electrode. A material having $BaTiO_3$ as the main component is used as the dielectric material. Dielectric ceramics having an internal electrode are obtained by pressing stacked dielectric materials coated with the electrode material into a monolithic multi-layer body, which is fired in a natural atmosphere at 1250° to 1350° C. Then, an external electrode conducting with the internal electrode is baked on edge faces of the dielectric ceramic to obtain the monolithic ceramic capacitor.

With regard to the material of the internal electrode, the following conditions must be satisfied: (a) since the dielectric ceramics and the internal electrode are baked simultaneously, the melting point must be higher than the firing temperature of the dielectric material; and (b) the material must not oxidize even in an oxidizing atmosphere, and the material must not react with the dielectric material.

An electode material which satisfies these conditions is the noble metals, such as platinum, gold and palladium.

However, while these electrode materials have superior characteristics, they are very expensive. Therefore, the cost of the electrode material in the monolithic ceramic capacitor is 30 to 70% of the whole cost of the capacitor, and is the biggest factor in the manufacturing cost of a monolithic ceramic capacitor.

There are base metals, such as Ni, Fe, Co, W and Mo, besides the nobel metals which have a high melting point. These base metals however, are liable to oxidize in an oxidizing atmosphere and not function as the electrode. Accordingly, in order to use these base metals as the internal electrode of a monolithic ceramic capacitor, they must be fired in a neutral or reducing atmosphere together with the dielectric material. The conventional dielectric ceramic materials, however, when fired in a reducing atmosphere, are reduced remarkably and become semiconductive.

In order to avoid the problems discussed above, a dielectric material having a ratio of Ba sites/Ti sites above the stoichiometric ratio in a barium titanate solid solution was devised. See, for example, Japanese Patent Publication No. 42588/82 and U.S. Pat. No. 4,115,493. By using such a dielectric material, a dielectric ceramic is obtained which does not become semiconductive even when fired in a reducing atmosphere, enabling manufacture of a monolithic ceramic capacitor using a base metal, such as nickel and the like, as the internal electrode.

Miniaturization of electronic components in the development of electronics has progressed rapidly in recent years resulting in a trend to miniaturize monolithic ceramic capacitors.

In the miniaturizing of monolithic ceramic capacitors, a dielectric layer is formed into a thin film. When the thickness of the thin film is below 10 m, the number of crystal grains is reduced in one layer of ceramic sheet, so that the reliability of the monolithic ceramic capacitor is reduced.

SUMMARY OF THE INVENTION

It is, therefore, a primary object of the present invention to provide a nonreducing dielectric ceramic composition which does not become semiconductive even when fired in a reducing atmosphere, and enables miniaturization of a monolithic ceramic capacitor when used.

The present invention is directed to the nonreducing dielectric ceramic composition whose main component is respective oxides of Ba, Ca, Mg, Sr, Ce, Ti and Zr, represented by the following general formula, $(Ba_{1-l-m-n-o}Sr_lCa_mMg_nCe_o)_q Ti_{1-p}Zr_p)O_3$, where l, m, n, o, p and q satisfy $0.05 \leq l \leq 0.30$, $0.005 \leq m \leq 0.22$, $0.0005 \leq n \leq 0.05$, $0.0005 \leq o \leq 0.02$, $0 < p \leq 0.20$, $1.002 \leq q \leq 1.03$, and for 100 mole % of the main component, the composition includes 0.02 to 2.0 mole % of one or more of the respective oxides of Mn, Fe, Cr and Co represented as $MnO_2$, $Fe_2O_3$, $Cr_2O_3$ and CoO.

According to the present invention, a nonreducing dielectric ceramic composition which does not reduce and become semiconductive even when fired in a non-reducing atmosphere can be obtained. Accordingly, when this nonreducing dielectric ceramic composition is used for manufacturing a monolithic ceramic capacitor, base metals may be used as an electrode material and thus the cost of the monolithic ceramic capacitor can be reduced.

The grain size of ceramics using the nonreducing dielectric ceramic composition in accordance with the invention, can be minimized as compared with conventional dielectric compositions. Thus, when manufacturing a monolithic ceramic capacitor, the quantity of crystal grains in the layer does not reduce as in the conventional monolithic ceramic capacitor, even when a dielectric layer is formed into a thin film. Therefore, a monolithic ceramic capacitor having high reliability and which can be miniaturized is obtained.

The above and other objects, features, aspects and advantages of the present invention will become more apparent from the following detailed description of the embodiments.

DESCRIPTION OF THE PREFERRED EMBODIMENTS

In accordance with the invention, raw materials, $BaCo_3$, $SrCo_3$, $MgCo_3$, $CeO_2$, $TiO_2$, $ZrO_2$, $MnO_2$, $Fe_2O_3$, $CrO_2$, CoO having purity above 99.8% were prepared. These raw materials where weighed to obtain a final sample represented by the composition formula, $(Ba_{1-l-m-n-o}Sr_lCa_mMg_nCe_o)_q(Ti_{1-p}Zr_p)O_3$, where proportions of l, m, n, o, p, and q were as shown in Table 1. The weighed raw material was subjected to wet mixing in a ball-mill, dried after being pulverized and calcined for two hours in air at 1100° C. to obtain a calcined product. A mixed aqueous solution consisting of an organic binder, a dispersant and 15% by weight of a defoaming agent was added to the calcined powder, and mixed in a ball-mill with 50% by weight water, then pulverized to prepare a slurry.

The slurry was introduced into a doctor blade to form green sheets. The green sheets were laminated and pressed into a stacked body. The stacked body was punched to obtain a disc having a 10 mm diameter and 1 mm thickness. The disc was heated to 500° C. in air to burn the organic binder, then fired for two hours at 1250° to 1350° C. in a reducing atmospheric oven filled with $H_2$-$N_2$-air gases having a $3 \times 10^{-8}$ to $3 \times 10^{-10}$ atm oxygen partial pressure to obtain a sintered body. The resulting sintered body was coated with In-Ga alloy on its main surfaces to prepare a sample for measuring characteristics.

Electrostatic capacity (c) and dielectric loss (tan $\delta$) were measured for the resulting sample at 1 KHz and 1 $V_{rms}$ using an automatic bridge. The insulation resistance (R) was measured by a high insulation resistance tester after applying a DC voltage of 500 V for two minutes. The insulation resistance was measured at 25° C. and 85° C. and logarithms (log $\rho$) of respective resistivities were calculated. Meanwhile, the crystal grain diameter of the sample was evaluated by observing the sample surface with an electron microscope. The measured results are shown in Table 2.

In $(Ba_{1-l-m-n-o}Sr_lCa_mMg_nCe_o)_q(Ti_{1-p}Zr_p)O_3$, when the strontium quantity l is 0.05 or less, as in Sample No. 1, sintering of the ceramic is poor and the permittivity becomes smaller, below 6000. When the strontium quantity l exceeds 0.30, as in Sample No. 25, sintering becomes extremely poor, which is not desirable.

Furthermore, when the calcium quantity m is less than 0.005, as in Sample No. 2, sintering of the ceramics is poor and the permittivity becomes below 6000 and the dielectric loss exceeds 5.0%. Meanwhile, when the calcium quantity m exceeds 0.22, as in Sample No. 24, sintering becomes extremely poor, which is not desirable.

Also, when the magnesium quantity n is less than 0.0005, as in Sample No. 3, sintering of the ceramics is poor and the permittivity becomes smaller below 6000. On the other hand, when the magnesium quantity n exceeds 0.05, as in Sample No. 23, the permittivity becomes smaller, below 1000.

A cerium quantity o less than 0.0005, as in Sample No. 4, is not desirable because the crystal grain diameter of the ceramic exceeds 3 $\mu$m, and a dielectric layer cannot be formed into a thin film. On the other hand, when the cerium quantity o exceeds 0.02, as in Sample 22, ceramics fired in a reducing atmosphere are reduced and become semiconductive, thus insulation resistance is lowered drastically, which is not desirable.

When the zirconium quantity p is 0, as in Sample 5, dielectric loss becomes larger, above 5.0%. On the other hand, when the zirconium quantity p exceeds 0.20, as in Sample 21, sintering is poor, and permittivity is below 6000, and the dielectric loss is above 5.0%, which is not desirable.

When a molar ratio q of $(Ba_{1-l-m-n-o}Sr_lCa_mMg_nCe_o)$ is less than 1.002, as in Sample 6, ceramics fired in a reducing atmosphere are reduced and insulation resistance is lowered. Meanwhile, when the molar ratio q exceeds 1.03, as in Sample No. 20, sintering is poor, which is not desirable.

When the additives $MnO_2$, $Fe_2O_3$, $Cr_2O_3$ and CoO are less than 0.02 mole %, as in Sample 7, insulation resistance at 85° C. or more is reduced and reliability after long use at high temperature is reduced. Meanwhile, when the quantity of additives exceeds 2.0 mole %, as in Samples 18 and 19, dielectric loss becomes 5.0% or more, which is not desirable.

On the contrary, when the nonreducing dielectric ceramic composition of the present invention is used, the ceramics are not reduced even when fired in the reducing atmosphere, thus dielectric ceramics with limited deterioration of insulation resistance can be obtained. Accordingly, base metals such as nickel and the like can be used as the material of the internal electrode and the cost of the monolithic ceramic capacitor can be reduced.

Furthermore, the crystal grain diameter is small, below 3 $\mu$m, and a large number of crystal grains are present between the dielectric layers even when the dielectric layer is formed into a thin film, so that the dielectric ceramics having a high reliability can be manufactured. In addition, since the dielectric ceramics can be formed into a thin film, the monolithic ceramic capacitor can be miniaturized.

Various changes and modifications can be made in the compositions and methods of the present invention without departing from the spirit and scope thereof. The various embodiments which have been described herein were for the purpose of illustrating the invention but were not intended to limit it.

What is claimed is:

1. A monolithic ceramic capacitor, comprising a dielectric ceramic body including a multi-layer body of dielectric ceramic material, an internal electrode located in said dielectric ceramic body, the internal electrode comprising nickel, and an external electrode located at an edge portion of said dielectric ceramic body, the external electrode being connected to said internal electrode, wherein said dielectric ceramic material comprises a main component consisting of respective oxides of Ba, Ca, Mg, Sr, Ce, Ti and Zr, the main component having the following formula:

wherein l, m, n, o, p and q are the following:
$0.05 \leq l \leq 0.30$
$0.005 \leq m \leq 0.22$
$0.0005 \leq n \leq 0.05$
$0.0005 \leq o \leq 0.02$
$0 \leq p \leq 0.02$
$1.002 \leq q \leq 1.03$, and wherein for 100 mole % of said main component, the dielectric ceramic material includes between 0.02 to 2.0 mole % of an oxide selected from the group consisting of $MnO_2$, $Fe_2O_3$, $Cr_2O_3$, CoO and mixtures thereof.

2. The monolithic ceramic capacitor according to claim wherein the crystal grain diameter of said dielectric ceramic body is below 3 $\mu$m.

* * * * *

UNITED STATES PATENT AND TRADEMARK OFFICE
CERTIFICATE OF CORRECTION

PATENT NO. : 5,202,814
DATED : April 13, 1993
INVENTOR(S) : Yoslhiaki Kohno, et al It is certified that error appears in the above-indentified patent and that said Letters Patent is hereby corrected as shown below:

Abstract, line 4, for "$Ba_{l\text{-}m\text{-}n\text{-}o}$" read -- $Ba_{1\text{-}l\text{-}m\text{-}n\text{-}o}$ --; line 5, for "1," read -- $1,$ --; and line 7, for "$0 \leq p \leq 0.20$" read -- $0 < p \leq 0.20$ --.

Column 1, line 36, for "electode" read -- electrode --; line 46, for "nobel" read -- noble --; Col.2, line 5, for "10 m" read -- 10 $\mu$m --.

Column 2, line 20, for "1" read -- $1$ --; line 39, delete ","; line 57, for "where" read -- were --; line 59, for "$Til\text{-}p$" read -- $Ti_{1\text{-}p}$ --; and line 60, for "1," read -- $1,$ --.

Column 3, line 26, for "1" read -- $1$ --".

Column 4, line 48, for "1" read -- $1,$ --; line 49, for "1" read -- $1$ --; line 53, for "$0 \leq p = \leq 0.02$" read -- $0 < p \leq 0.20$ --; and line 60, after "claim" read -- 1 --.

Signed and Sealed this

Twenty-fifth Day of April, 1995

Attest:

BRUCE LEHMAN

Attesting Officer     Commissioner of Patents and Trademarks